GROWTH CONTROL OF DISPROPORTIONATION PROCESS

Filed April 2, 1964 4 Sheets-Sheet 1

INVENTORS
GEORGE CHEROFF
ARNOLD REISMAN
BY Allen A. Meyer, Jr.
ATTORNEY

GROWTH CONTROL OF DISPROPORTIONATION PROCESS

Filed April 2, 1964

4 Sheets-Sheet 2

3,345,209
GROWTH CONTROL OF DISPROPORTIONATION PROCESS

George Cheroff, Peekskill, and Arnold Reisman, Yorktown Heights, N.Y., assignors to International Business Machines Corporation, New York, N.Y., a corporation of New York Filed Apr. 2, 1964, Ser. No. 356,850
14 Claims. (Cl. 117—201)

This invention relates to a process for conducting an epitaxial deposition of germanium in an alternating current fashion such that termination of the growth process can be effected abruptly, and, thus, by such a process of alternately depositing and etching the grown deposit, enhanced surface characteristics may be obtained. More particularly, in a system which employs hydrogen iodide as a vapor phase transporting vehicle for germanium, ultraviolet radiation is used to break the hydrogen-iodine bond in hydrogen iodide changing the equilibrium nature of the system in such a way that the deposition process is interrupted asymmetrically so as to cause deposition and etching of the growing layer in an alternating fashion. The disruption of the equilibrium is such as to cause the hydrogen present to behave as an inert gas. The cycle is arranged such that etching proceeds for a shorter time period than does deposition. When complete cessation of deposition is desired, the process can be abruptly terminated by employing a deposition-etching cycle which is balanced and does not permit further deposition or removal.

In conventional open tube gas transport disproportionation reactions, the imposition of a temperature gradient along the gas flow path results in a deposition process being essentially unidirectional. Thus, one is unable to effect a recrystallization process on the surface of the growing layer. It would be highly desirable if one were able to deposit and then remove some of the deposit in order to allow the surface atoms to rearrange in a more perfect fashion. Such a process would be most important in the region of a grown semiconductor junction where maximum crystal perfection is desired. Maximum crystal perfection at the grown junction of a semiconductor device will contribute to increased interface mobility which enables greater frequency response of such devices.

It has been reported by Reisman and Alyanakyan J. El. Chem. Soc., vol. 110, No. 8 (1963) (Elect. Soc. Meeting Sept. 29–Oct. 3, 1963, Abs. 141) that the thermodynamic equilibria in the system $Ge–I_2–H_2–He$ are markedly susceptible to the mole fraction of hydrogen relative to $H_2+He$ present in the gas phase. This susceptibility manifests itself in the following manner: In a system constrained by a one atmosphere total pressure requirement at constant source iodine pressure, the efficiency of germanium uptake per mole of iodine employed decreases with increasing hydrogen concentration. The reason for this change of efficiency with hydrogen concentration change is that at a higher hydrogen partial pressure more hydrogen iodide forms, making less iodine available for transport of the germanium. If one can decompose a percentage of the hydrogen in the existing equilibrium state to a level other than initially imposed, the decomposition of germanium can be disrupted. Thus, in an open tube transport system, one can cause deposition or etching to occur at a germanium deposition site. It is known that hydrogen iodide may be dissociated by ultraviolet radiation. It is also known that the recombination of hydrogen and iodine to form hydrogen iodide is kinetically limited, requiring catalysis to enable the reaction to proceed. In a flowing gas system whose flow conditions are properly controlled, it has been shown that one can approach a state of equilibrium relative to germanium deposition via an iodine transport reaction. The process of the invention utilizes high intensity ultraviolet radiation to shift the equilibrium that exists in the system $Ge–I_2–H_2–He$ to a level of equilibrium that would have existed if different starting conditions had been employed and which would require etching of germanium at the temperature of the deposition region. By a proper choice of starting conditions, such as will be described, this can result in substrate etching at the deposition site when ultraviolet radiation is impinged on the gas stream, and when the ultraviolet radiation is removed deposition occurs.

It is an object of the invention to epitaxially deposit germanium from a system containing hydrogen iodide.

It is another object of the invention to epitaxially deposit germanium in cyclic deposition-etching fashion from a system containing hydrogen iodide.

A further object of the invention is to epitaxially deposit germanium in a cyclic deposition-etching reaction such that there is alternately deposition and removal of the grown deposit from a system containing hydrogen iodide.

Still a further object of the invention is the epitaxial deposition of germanium from a system containing hydrogen iodide in such a manner that there is alternately deposition and removal of the grown deposit and at the conclusion, the deposit exhibits enhanced interface characteristics between the substrate and grown single crystal.

Another further object of the invention is a process which employs a hydrogen iodide vapor phase transporting vehicle for a germanium ultraviolet radiation reaction which comprises changing the equilibrium nature of the system so that the ultraviolet radiation is used to break the hydrogen-iodine bond in hydrogen iodide in such a way that the deposition process is interrupted asymmetrically so as to cause deposition and etching of a growing layer in an alternating fashion.

The foregoing and other objects, features and advantages of the invention will be apparent from the following more particular description of preferred embodiments of the invention, as illustrated in the accompanying drawings.

Figure 2:
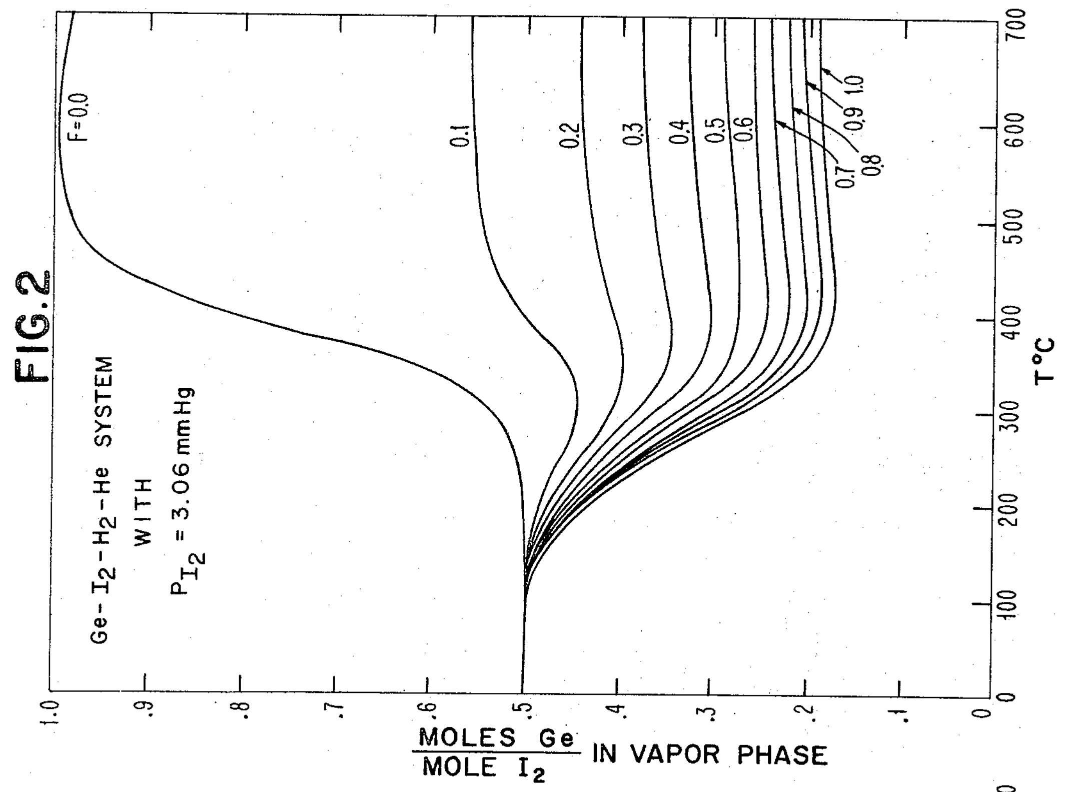
FIGS. 1–6 represent plots of the vapor phase content of germanium per mole of available iodine as a function of temperature in the system $Ge–I_2–H_2–He$. Each figure pertains to a different starting iodine source pressure.
Figure 1:
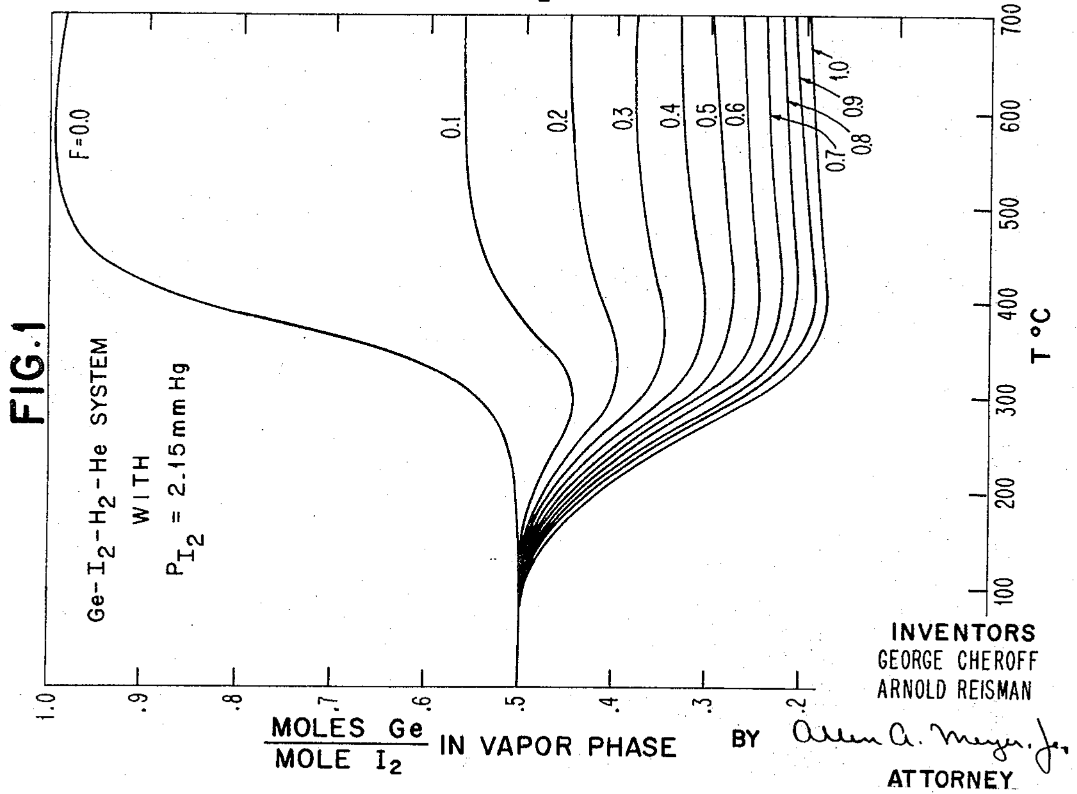
Figure 4:
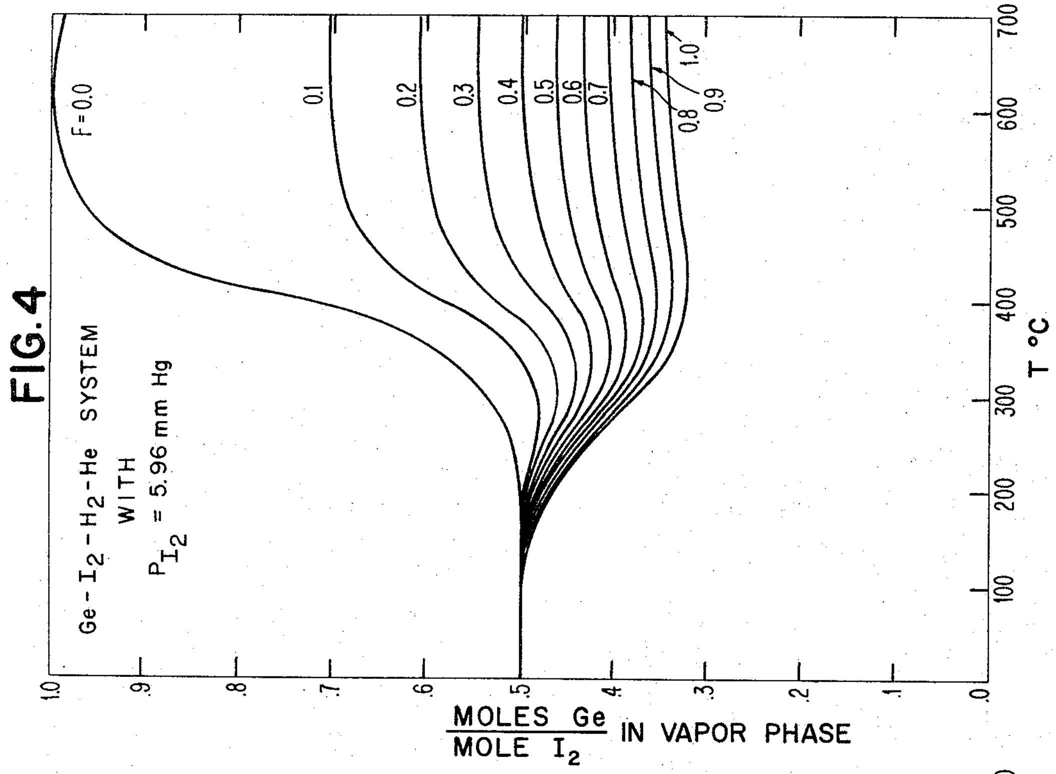
Figure 3:
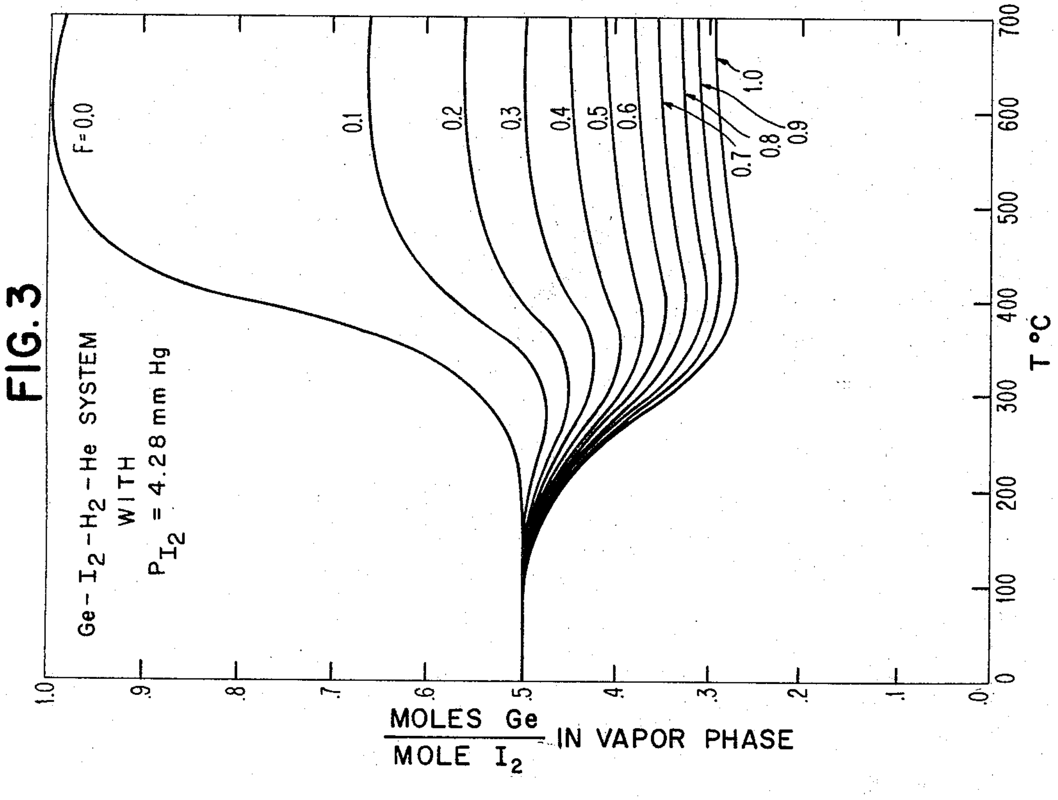
Figure 6:
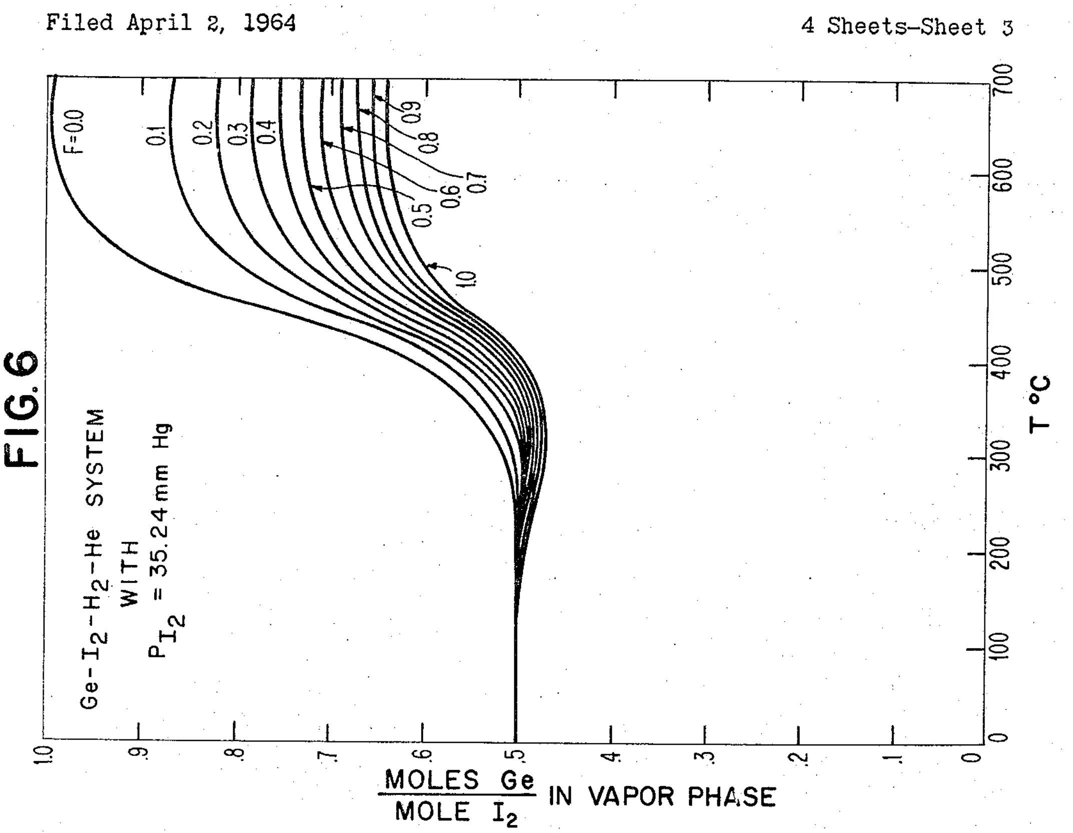
Figure 5:
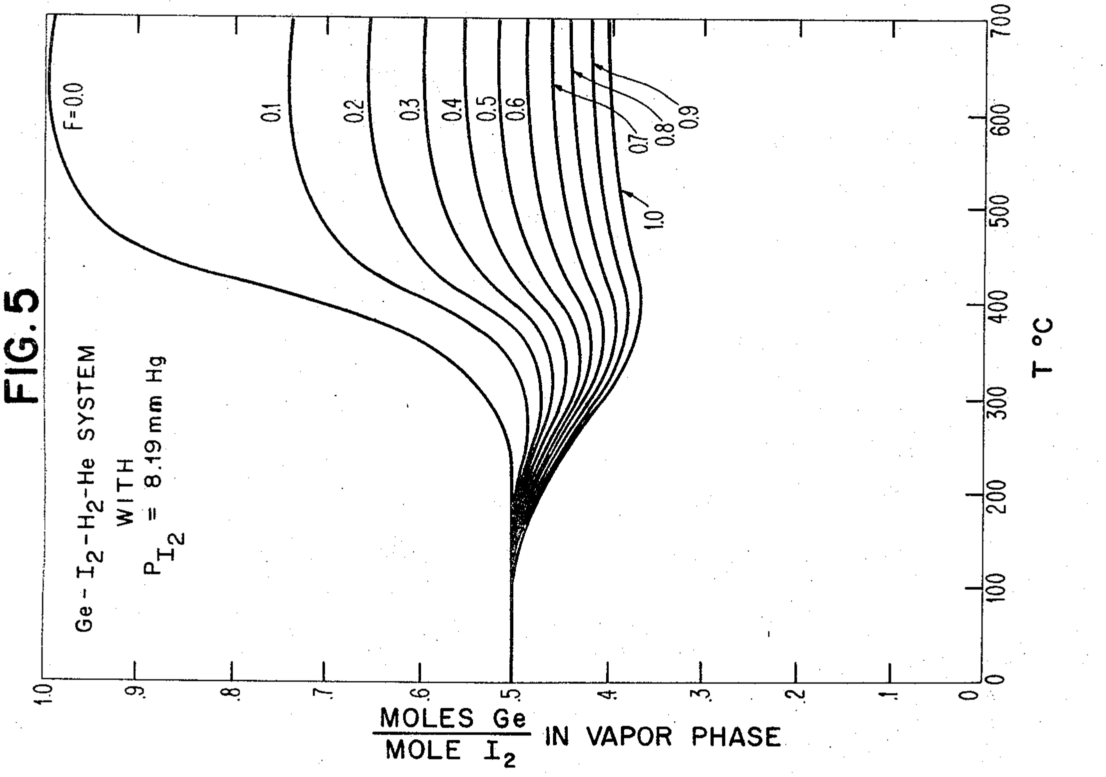

The process of the invention can best be demonstrated by a discussion of FIG. 1.

FIG. 1 is a plot of the vapor phase content of germanium per mole of available iodine as a function of temperature in the system $Ge–I_2–H_2–He$. Each of the curves in FIG. 1 represents a system in which the source bed pressure of iodine is maintained constant, but in which the carrier gas used to transport the iodine through a source bed of germanium is comprised of a different $H_2/(H_2+He)$ mole fraction ratio. Thus, the curve marked F=0.0 represents the variation of $Ge/I_2$ ratio in the vapor phase as a function of temperature when no hydrogen is present and helium alone serves as a carrier gas. It will be noted that with decreasing temperature, the number of moles of germanium per mole of iodine present in the gas phase decreases. Thus, if the iodine-helium mixture is permitted to equilibrate with a germanium bed at a temperatur eof 600° C., and the gas is then brought to some lower temperature, germanium will deposit from the gas phase. A process in which transport of the germanium occurs in the manner described above is termed a hot-to-cold transport process. The curve designated F=0.1 describes the composition of the vapor phase when the $H_2/(H_2+He)$ ratio has a value of 0.1. It will be noticed that the shape of this curve is different from that in which the ratio is zero. At a temperature of 600° C., for example, the vapor phase content of germanium per mole of iodine is much lower than that in the curve designated by F=0.0. Similar considerations apply when both curves are compared at 350° C. If we now consider the curve designated F=0.1, it is seen that at 600° C., the $Ge/I_2$ vapor phase ratio has a value of 0.57 while at 350° C., this value drops to 0.47. At 350° C., the curve for F=0.0 shows that the $Ge/I_2$ ratio has a value of 0.63 which is higher than the value achievable even at 600° C. or higher in the curve designated F=0.1. If sufficient hydrogen iodide formed under the conditions demanded by the curve designated F=0.1 is decomposed to make the value of the $Ge/I_2$ ratio 0.57 then no deposition can occur at 350° C. in a system restricted by the conditions specified in the F=0.1 curve, since the vapor phase is precisely in equilibrium at all temperatures. If sufficient hydrogen iodide is decomposed so that the equilibrium requirements for the vapor phase $Ge/I_2$ content is greater than 0.57, the gas stream will etch any solid phase of germanium which it may contact. If the amount of hydrogen iodide decomposed results in an equilibrium vapor phase content of $Ge/I_2$ less than 0.57, deposition of germanium will occur from the system whose conditions are designated F=0.1. The same considerations discussed for the relative effects between the curves designated F=0.0 and F=0.1 apply to any other pair of curves shown in FIG. 1, for example, the curves for F=0.1 and 0.2 or F=0.0 and 0.2, etc.

FIGS. 2–6 show similar plots as described by FIG. 1, each figure pertaining to a different starting iodine source pressure, and each figure subject to the same interpretation as that given in FIG. 1.

Figure 7:
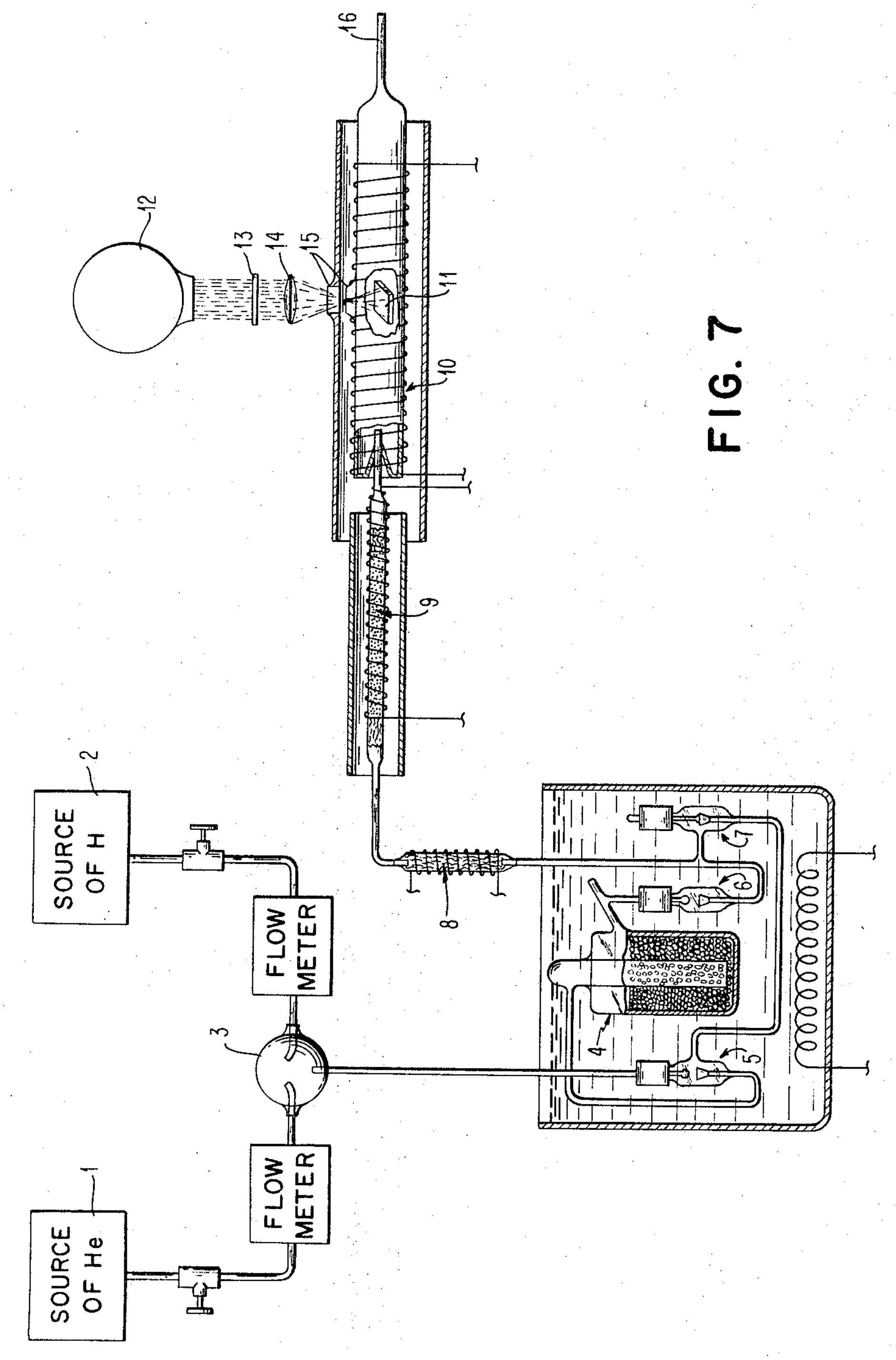
FIG. 7 is a schematic representation of the reaction train.

FIG. 7 is a schematic representation of a suitable reaction train in its entirety. All portions except heater wires are fabricated of fused quartz, although Pyrex may be employed excepting where elevated temperatures are employed. Helium from a source 1 is mixed with hydrogen from a source 2 in the mixing chamber 3 in the proper amounts to provide a $H_2/(H_2+He)$ ratio deemed suitable from inspection of the curves shown in FIGS. 1–6. This mixture is passed through a heated packed bed of iodine crystals 4 when the magnetically actuated valves 5 and 6 are in an open position and valve 7 closed, at a flow rate which insures that the gas mixture becomes saturated with iodine vapor. When the valves 5 and 6 are closed and valve 7 is open, the $H_2/He$ mixture bypasses the iodine bed. The entire valve and iodine source bed arrangement is located in a thermostatically controlled oil bath. The temperature of the bath is determined by the desired vapor pressure of iodine and, for example, can be from room temperature to 180° C. The oil used in the bath is any temperature resistant oil such as silicone oil, transformer oil. For an iodine bed, 10 inches long and a 2-inch interior diameter, flows up to 2 liters per minute are usable. It is important to note that the minimum value of the partial pressure of hydrogen that may be employed must be greater than the equilibrium vapor pressure of the iodine source bed. This is necessary to insure complete conversion of the iodine emanating from the iodine source 4 to hydrogen iodide when the gas mixture is passed through the platinum wool catalyst chamber 8 maintained at between 300°–400° C. This chamber is 12 inches long times 1½ inches interior diameter and is packed with crumpled thermocouple grade 1 mil platinum wire. The effluent from this chamber consisting of a mixture of hydrogen, helium, and hydrogen iodide is next carried through a germanium source bed 9 heated to between 550° and 650° C. preferably 600° C. where the data depicted in FIGS. 1–6 show a temperature insensitive region (a plateau or a minimum in the curves) in terms of the $Ge/I_2$ vapor phase ratio. The source bed is 16 inches long with an interior diameter of 1½ inches packed with crushed cleaned germanium. The equilibrium effluent from the germanium source bed 9 is carried next into the deposition chamber 10 containing substrate single crystal wafers 11 of germanium or gallium arsenic or other suitable material (e.g., GaP, InSb and alloys of GaP-GaAs, etc.) maintained at a temperature lower than that in the germanium source bed 9 and preferably at a temperature between 300° C. and 400° C. This temperature interval as seen from the data depicted in FIGS. 1–6 shows relatively temperature insensitive regions as regards $Ge/I_2$ vapor phase ratio, a highly desirable attribute for a vapor growth process. When growth is desired, the ultraviolet source 12 is maintained in an off position permitting the vapor phase to become depleted of germanium to the extent shown by the curves plotted in FIGS. 1–6, more specifically for the particular curve whose experimental requirements have been established at the outside of the growth process. Light from source 12 passes through the narrow band pass filter 13, focusing lens 14, and quartz windows 15 before entering the reaction chamber. The reaction products are permitted to exit from the system at 16. When it is desired to alternately deposit and etch the growing single crystal, the ultraviolet source 12, a high pressure xenon source, capable of delivering an ultraviolet output of ten watts or more in the range 2000–4000 A. is pulsed (is cycled ON–OFF) for specified lengths of time, the pulse frequency being higher at the beginning of the deposition and shorter once the junction between the substrate single crystal and the growing crystal has been formed when only the junction perfection is deemed critical. When the crystal perfection of the entire grown crystal is deemed critical, the pulse frequency is maintained at a high level throughout the process, i.e., the ultraviolet light is on every third minute.

*Example* 1

Reagent grade hydrogen flowing at a rate of 30 cc. per minute is mixed with reagent grade helium flowing at a rate of 120 cc. per minute. This mixture is carried through an iodine bed 10 inches long with a two inch interior diameter packed with semiconductor grade iodine crystals (highest purity), the entire bed being heated to 50.5°±0.1° C. The $I_2$-$H_2$-He effluent from the iodine source bed flows into a platinum catalyst chamber 12 inches long by one inch interior diameter packed with crumpled 1 mil thermocouple grade platinum wire. The crumpled wire may be described as a platinum wool. This platinum catalyst bed is heated to 340° C. The effluent from this bed consists of hydrogen iodide, hydrogen, helium, and is carried into a germanium source bed (16 inches long, 1½ inch interior diameter) packed with crushed germanium and heated to 600° C.±5° C. The effluent from this bed consisting chiefly of germanium iodides, hydrogen iodide, hydrogen and helium is next carried into a deposition chamber 20 inches long with a 2-inch interior diameter heated to 350° C. and containing a germanium single crystal wafer 0.5 inch diameter and 20 mil thick. Under these conditions, germanium deposits from the vapor in the deposition chamber, and onto the single crystal substrate where an epitaxial layer deposits at a rate of 0.6 micron per hour. After 25 hours, 15 microns have been deposited.

*Examples 2–7*

The process of Example 1 is repeated except that the conditions listed in Table 1 for each example is used:

This platinum catalyst bed is heated to 340° C. the effluent from this bed consists of hydrogen iodide, hydrogen, helium, and is carried into a germanium source bed (16

TABLE I

| Ex. No. | $H_2/H_2+He$ | $I_2$ Pressure at $I_2$ Source (mm. of Hg) | Catalytic Bed Temp. (° C.) | Ge Source Temp. (° C.) | Substitute Temp. (° C.) | Deposition Rate (microns per hr.) |
|---|---|---|---|---|---|---|
| 2 | .2 | 2.15 | 300 | 650 | 400 | 0.7 |
| 3 | .2 | 2.15 | 400 | 550 | 300 | 0.8 |
| 4 | .1 | 8.19 | 360 | 600 | 300 | 0.1 |
| 5 | .6 | 35.24 | 380 | 625 | 350 | 1.0 |
| 6 | .3 | 4.28 | 370 | 600 | 320 | 1.5 |
| 7 | .1 | 5.96 | 350 | 575 | 325 | 2.7 |

*Example 8*

Reagent grade hydrogen flowing at a rate of 30 cc. per minute is mixed with reagent grade helium flowing at a rate of 120 cc. per minute. This mixture is carried through an iodine bed 10 inches long with a two inch interior diameter packed with semiconductor grade iodine crystals (highest purity), the entire bed being heated to 50.5°±0.1° C. The iodine-hydrogen-helium effluent from the iodine source bed flows into a platinum catalyst chamber 12 inches long by 1 inch interior diameter packed with crumpled 1 mil thermocouple grade platinum wire. The crumpled wire may be described as a platinum wool. This platinum catalyst bed is heated to 340° C. The effluent from this bed consists of hydrogen iodide, hydrogen, helium, and is carried into a germanium source bed (16 inches long, 1½ interior diameter) packed with crushed germanium and heated to 600° C.±5° C. The effluent from this bed consisting chiefly of germanium iodides, hydrogen iodide, hydrogen and helium is next carried into a deposition chamber 20 inches long with a 2 inch interior diameter heated to 350° C. and containing a germanium single crystal wafer 0.5 inch diameter and 20 mil thick. An Osram HBO 107/1 super pressure mercury ultra-violet lamp which functions as a high intensity ultra-violet source is focused upon the substrate single crystal wafer. This lamp is located on the outside of the deposition chamber 3 inches from the single crystal substrate. Interspersed between the lamp and the single crystal substrate is a quartz focusing lens. The focused light passes into the reaction chamber through an optical quartz window. A Corning glass 7–45 ultra-violet bandpass transmitting filter is inserted between the Osram source and the quartz focusing lens. This ultra-violet filter only transmits light having wavelengths between 2300–4200 A. The light is kept on continuously during the entire 25 hours during which the experiment is conducted. At the conclusion of the process no deposit is observed to have grown on the single crystal substrate wafer. In fact, the wafer has lost 15$\mu$ of its initial thickness (i.e. 20 mils). This demonstrates that under the influence of ultra-violet light the process of Example 1 is counteracted to such an extent that only etching occurs in the deposition chamber.

*Example 9*

Reagent grade hydrogen flowing at a rate of 30 cc. per minute is mixed with reagent grade helium flowing at a rate of 120 cc. per minute. This mixture is carried through an iodine bed 10 inches long with a 2 inch interior diameter packed with semiconductor grade iodine crystals (highest purity), the entire bed being heated to 50.5°±0.1° C. The iodine, hydrogen-helium effluent from the iodine source bed flows into a platinum catalyst chamber 12 inches long by 1 inch interior diameter packed with crumpled 1 mil thermocouple grade platinum wire. inches long, 1½ interior diameter) packed with crushed germanium and heated to 600° C.±5° C. An Osram HBO 107/1 super pressure mercury ultra-violet lamp which functions as a high intensity ultra-violet source is focused upon the substrate single crystal wafer. This lamp is located on the outside of the deposition chamber 3 inches from the single crystal substrate. Interspersed between the lamp and the single crystal substrate is a quartz focusing lens. The focused light passes into the reaction chamber through an optical quartz window. A Corning glass 7–45 ultra-violet bandpass transmitting filter is inserted between the Osram source and the quartz focusing lens. This ultra-violet filter only transmits light having wavelengths between 2300–4200 A. The light is cycled on and off, the on cycle being for 1 minute, the off cycle being for 2 minutes. The growth of the epitaxially deposited single crystal is reduced to 0.4 of a micron per hour demonstrating that when the light is on the growth rate is reduced. At the end of 25 hours, 10 microns had been deposited in all. The alternating cycle growth method described in this example, results in an epitaxial deposit exhibiting a higher degree of crystalline perfection than obtained in Example 1. Thus, the etch pit count (which is the number of dislocations per square cm.) of the sample grown in Example 1 is approximately $10^4$ per cm.$^2$. This figure represents a high quality epitaxial layer obtained by the best techniques for germanium growth from the vapor phase at the temperature described. The number of dislocations per square cm. in the epitaxial single crystal deposit of Example 9 is only $10^2$ per cm.$^2$.

*Example 10*

The process of Example 9 is repeated with the following modifications:

During the first and last hours, the ultraviolet source is cycled one minute ON—one minute OFF. For 25 intervening hours the ultraviolet source is cycled one minute ON—two minutes OFF. At the conclusion of the process of this example, a total growth of 10 microns has occurred demonstrating that during the first and last hours of the process when the light was cycle ON and OFF for equal time intervals neither a net growth nor a net etching was obtained. The quality of the grown epitaxial layer is equivalent to that of Example 9.

The deposited epitaxial layers of germanium have utility as starting material for the fabrication of semiconductor devices which may be used in radios, computer circuits, etc.

Thus, the process of the invention provides a means for achieving a high degree of crystalline perfection in an epitaxially deposited single crystal of germanium by means of imposing an alternating ON-OFF ultraviolet stimulated etch growth cycle in a flowing gas system containing a mixture of hydrogen, helium, hydrogen iodide and iodides of germanium and also of instituting or stopping a deposition process via the use of a ultraviolet source, to shift equilibrium levels in a system comprised of hydrogen, helium, hydrogen iodide and germanium.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A process for depositing germanium epitaxially in a constant flow system at a constant total pressure which comprises:

(a) reacting hydrogen iodide with a source of germanium in presence of a carrier gas of hydrogen and an inert gas in a first temperature zone;

(b) subsequently decomposing the reaction products formed in said first zone in a second zone having a lower temperature than that of the first zone whereby germanium is freed and deposits epitaxially on a substrate in said second zone.

2. The process of claim 1 wherein the inert gas is helium.

3. A process for depositing germanium epitaxially in a constant flow system at a constant total pressure which comprises:

(a) forming hydrogen iodide as a result of catalytic action between hydrogen and iodine in a carrier gas mixture of an inert gas and sufficient hydrogen such that the hydrogen is always present in a greater amount than that needed to react fully with iodine present in vapor phase;

(b) reacting the hydrogen iodide with a source of germanium in presence of said carrier gas mixture in a first temperature zone;

(c) subsequently decomposing the reaction products formed in said first zone in a second zone having a lower temperature than that of said first zone whereby germanium is freed and deposits epitaxially on a substrate in said second zone.

4. The process of claim 3 wherein the inert gas is helium.

5. The process of claim 3 wherein the first zone has a temperature of 550°–650° C. and the second zone has a temperature of 300°–375° C.

6. A process for depositing germanium epitaxially in a continuous flow system at a constant total pressure which comprises:

(a) saturating a carrier gas mixture of an inert gas and hydrogen with iodine at an iodine source, the hydrogen being present in a molar quantity per unit volume of saturated gas mixture greater than molar quantity of iodine per unit volume of saturated carrier gas mixture;

(b) forming hydrogen iodide by passing the iodine saturated carrier gas mixture through a catalytic bed of platinum;

(c) reacting the hydrogen iodide with a source of germanium in presence of said carrier gas mixture in a first temperature zone;

(d) subsequently decomposing the reaction products formed in said first zone in a second zone having a lower temperature than that of the first zone whereby germanium is freed and deposits epitaxially on a substrate in said second zone.

7. The process of claim 6 wherein the carrier gas mixture of hydrogen and an inert gas contains from 0–5–5.0 volumes of hydrogen for each 10 volumes of total carrier gas mixture; the iodine at the iodine source has a vapor pressure of 1–37 mm. of Hg, the catalytic bed of platinum having a temperature of 300°–400° C.; the first zone having a temperature of 550°–650° C. and the second zone having a temperature of 300°–400° C.

8. The process of claim 7 wherein the inert gas is He and the substrate is a single crystal wafer selected from the group consisting of Ge, GaAs, GaP, and InSb.

9. A process for improved control of epitaxial deposition of germanium having enhanced crystallographic perfection which comprises:

(a) a reacting hydrogen iodide with a source of germanium in the presence of a carrier gas of hydrogen and an inert gas in a first temperature zone;

(b) subsequently decomposing the reaction products formed in said first zone in a second zone having a lower temperature than that of the first zone whereby germanium is freed and deposits epitaxially on a substrate in said second zone; and (c) periodically impinging ultraviolet radiation on deposit side of said substrate to control the crystallographic perfection of said epitaxial deposit.

10. A process for improved control of epitaxial deposition of germanium having enhanced crystallographic perfection which comprises:

(a) reacting hydrogen iodide with a source of germanium in presence of a carrier gas of hydrogen and an inert gas in a first temperature zone;

(b) subsequently decomposing the reaction products formed in said first zone in a second zone having a lower temperature than that of the first zone whereby germanium is freed and deposits epitaxially on a substrate in said second zone; and (c) periodically impinging ultraviolet radiation on deposit side of said substrate on an asymmetric cycle in which the ultraviolet radiation is OFF for a longer period of time than it is ON to effect a recrystallization of depositing layer of germanium which enhances its crystallographic perfection.

11. A process for improved control of epitaxial deposition of germanium having enhanced crystallographic perfection which comprises:

(a) reacting hydrogen iodide with a source of germanium in presence of a carrier gas of hydrogen and an inert gas in a first temperature zone;

(b) subsequently decomposing the reaction products formed in said first zone in a second zone having a lower temperature than that of the first zone whereby germanium is freed and deposits epitaxially on a substrate in said second zone; and (c) periodically impinging ultraviolet radiation on deposit side of said substrate in a symmetric cycle in which the ultraviolet radiation is OFF for a period of time equal to period of time it is ON;

(d) followed by periodically impinging ultraviolet radiation on deposit side of said substrate in an asymmetric cycle in which the ultraviolet radiation is OFF for a longer period of time than it is ON; and (e) again periodically impinging ultraviolet radiation on deposit side of said substrate in a symmetric cycle whereby the ultraviolet radiation is OFF for a period of time equal to period of time it is ON; thereby enhancing crystallographic perfection of deposited germanium.

12. A process for improved control of epitaxial deposition of germanium having enhanced crystallographic perfection which comprises:

(a) reacting hydrogen iodide with a source of germanium in presence of a carrier gas of hydrogen and an inert gas in a first temperature zone;

(b) subsequently decomposing the reaction products formed in said first zone in a second zone having a lower temperature than that of the first zone whereby germanium is freed and deposits epitaxially on a substrate in said second zone; and (c) periodically and asymmetrically impinging ultraviolet radiation on gas mixture in region of substrate such that radiation is on for shorter periods than it is OFF requiring said gas mixture to function as if less hydrogen were present thereby shifting the equilibrium nature of the gas such that etching of the depositing layer occurs during that portion of cycle in which ultraviolet radiation is ON thereby effecting a recrystallization of the depositing layer and enhancing crystallographic perfection of deposited germanium.

13. A process for improved control of epitaxial deposition of germanium having enhanced crystallographic perfection which comprises:

(a) saturating a carrier gas mixture of an inert gas and hydrogen with iodine at an iodine source, said mixture containing 0.5–5.0 volumes of hydrogen for each 10 volumes of total carrier gas mixture, said iodine at the iodine source having a vapor pressure of 1–37 mm. of Hg;

(b) forming hydrogen iodide by passing the iodine saturated carrier gas mixture through a catalytic bed of platinum having a temperature of 300°–400° C.;

(c) reacting the hydrogen iodide with a source of germanium in presence of said carrier gas mixture in a first zone having a temperature of 550°–650° C.;

(d) subsequently decomposing reaction products formed in said first zone in a second zone having a temperature of 300°–400° C. whereby germanium is freed and deposits epitaxially on a substrate in said second zone;

(e) periodically and asymmetrically impinging ultraviolet radiation on gas mixture in region of substrate such that the radiation is on for shorter periods than it is OFF requiring said gas mixture to function as if less hydrogen were present thereby shifting the equilibrium nature of the gas such that etching of the depositing layer occurs during that portion of cycle in which ultraviolet radiation is ON thereby effecting a recrystallization of the depositing layer and enhancing crystallographic perfection of deposited germanium.

14. The process of claim 13 wherein the inert gas is helium.

References Cited

UNITED STATES PATENTS

| | | | |
|---|---|---|---|
| 2,692,839 | 10/1954 | Christensen et al. | 148—175 |
| 3,142,596 | 7/1964 | Theuerer | 117—106 |
| 3,190,773 | 6/1965 | Anderson et al. | 148—175 |
| 3,200,018 | 8/1965 | Grossman | 117—107.2 |
| 3,234,057 | 2/1966 | Anderson | 148—174 |

ALFRED L. LEAVITT, *Primary Examiner.*

A. GOLIAN, *Assistant Examiner.*